United States Patent [19]

Shanley, II

[11] 4,126,884
[45] Nov. 21, 1978

[54] KINESCOPE BEAM CURRENT LIMITER EMPLOYING AUTOMATIC SEQUENTIAL CONTROL OF IMAGE CONTRAST AND BRIGHTNESS TO LIMIT BEAM CURRENT

[75] Inventor: Robert L. Shanley, II, Indianapolis, Ind.

[73] Assignee: RCA Corporation, New York, N.Y.

[21] Appl. No.: 794,088

[22] Filed: May 5, 1977

[51] Int. Cl.$^2$ .................. H04N 9/535; H04N 5/58; H04N 5/68

[52] U.S. Cl. .................................. 358/21; 358/27; 358/39; 358/40; 358/168; 358/169; 358/243

[58] Field of Search .................. 358/21, 27, 34, 39, 358/40, 168, 169, 170, 243

[56] References Cited

FOREIGN PATENT DOCUMENTS 2,021,037  11/1971  Fed. Rep. of Germany ........... 358/243

Primary Examiner—Robert L. Richardson

Attorney, Agent, or Firm—Eugene M. Whitacre; William H. Meagher; Ronald H. Kurdyla

[57] ABSTRACT

A beam current limiter for a kinescope responsive to video signals coupled to the kinescope via a video signal transmission channel comprises means for providing a control signal representative of the magnitude of kinescope beam current above a predetermined level. The control signal is related to the amount by which the beam current exceeds the predetermined level. When beam current exceeds the predetermined level by an amount within a first range of beam current, the control signal is coupled to the signal transmission channel to vary the peak amplitude of the video signal to inhibit beam current above the predetermined level. When beam current exceeds the predetermined level by a relatively greater amount within a second range of beam current, the control signal is coupled to the signal transmission channel to vary both the peak amplitude and the D.C. level of the video signal to inhibit beam current above the predetermined level.

19 Claims, 1 Drawing Figure

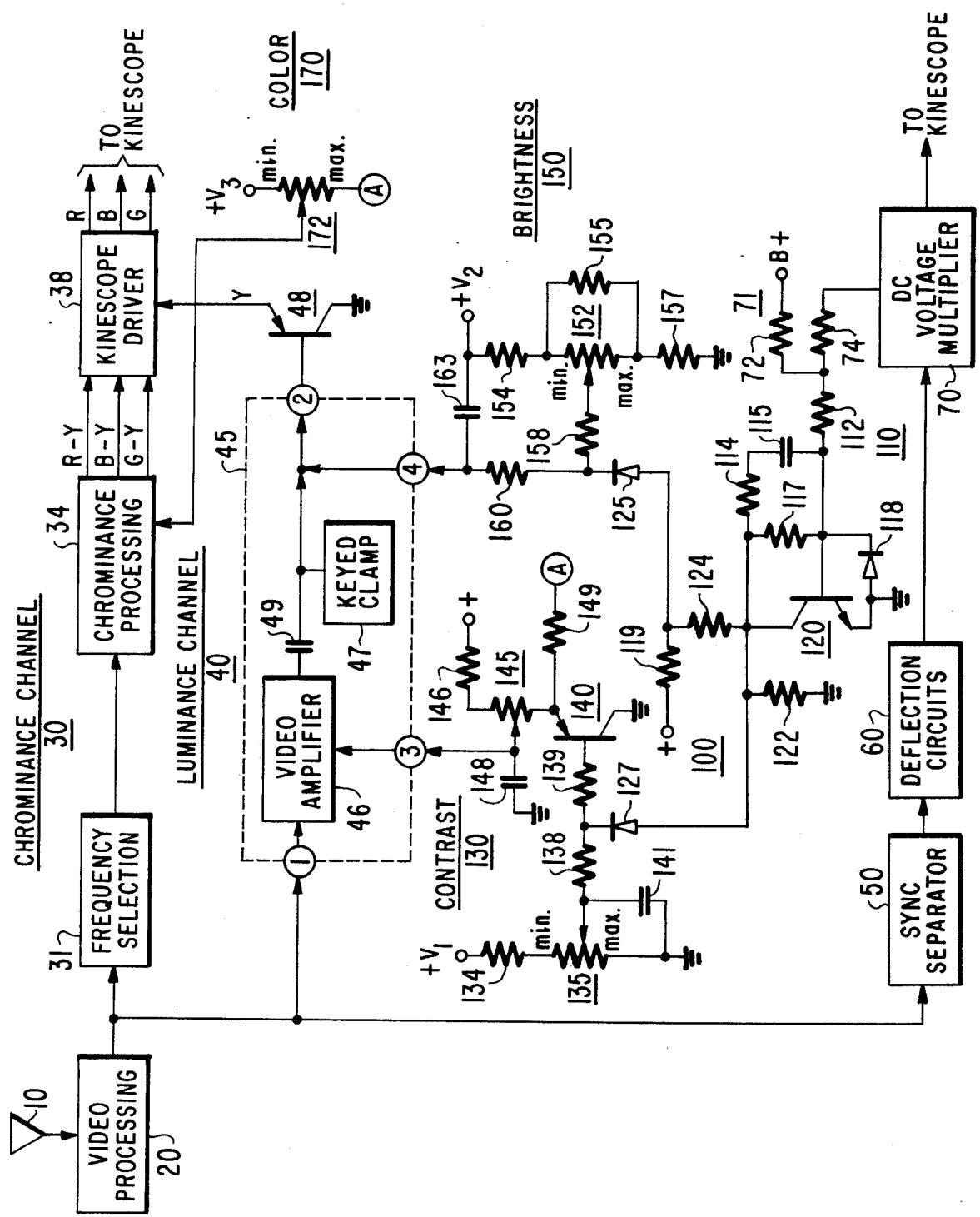

KINESCOPE BEAM CURRENT LIMITER EMPLOYING AUTOMATIC SEQUENTIAL CONTROL OF IMAGE CONTRAST AND BRIGHTNESS TO LIMIT BEAM CURRENT

This invention relates to apparatus for limiting the electron beam current drawn by an image reproducing device, such as a kinescope of a television receiver and, more particularly, to such apparatus operatively associated with image contrast and brightness control functions of a television receiver.

The content of an image reproduced by a kinescope of a television receiver comprises luminance information and also chrominance information in the case of a color image in a color television system. The luminance information is typically defined by a peak-to-peak amplitude of an image representative video signal, relating to image contrast, and the D.C. content of the video signal, relating to image brightness or background level.

The electron beam current drawn by a kinescope is a function of both the amplitude and D.C. content of the video signal coupled to the kinescope. Excessive beam current can be caused by a combination of video signal content and adjustment of manual brightness and contrast control circuits often included in a luminance signal processing channel of the receiver. The likelihood of high beam current being produced increases in the presence of video signals representative of bright images containing predominantly white information, contrast or brightness control settings at a maximum position, or a combination of these factors.

Excessive beam current may cause a receiver to produce a degraded image. More specifically, excessive beam current may cause degradation of the performance of the receiver's deflection system, electron beam spot defocussing, and picture blooming. Such high beam currents may also exceed the safe operating current capability of the kinescope, possibly causing damage to the kinescope and associated circuit components. The latter problem is compounded by the higher beam currents associated with the new-generation, high brightness kinescope.

Circuits operatively associated with the kinescope (e.g., deflection circuits) can be sensitive to peak beam current demand of the kinescope, and can be adversely affected by such peak currents. It is therefore desirable to control excessive peak beam currents in a manner which assists to reduce such adverse effects to an acceptable minimum.

It is also desirable for a beam current limiter to function without unnecessarily increasing a viewer's perception of changes in image content due to operation of the beam limiter. Thus, beam limiting should be accomplished in a manner which acknowledges that a viewer often can perceive changes in the background illumination of an image produced by changes in image brightness more readily than changes in image contrast. It is furthermore desirable for beam current limiting to be accomplished without unduly upsetting the relationship between contrast and brightness and between luminance and chrominance information of a reproduced image.

Various automatic beam current limiter systems are known which are operatively associated with brightness and contrast control circuits of a television receiver, as described, for example, in U.S. Pat. No. 3,873,767 (Okada et al.) and 3,009,989 (Ahrons et al.), wherein the contrast and brightness control circuits of a television receiver are simultaneously controlled to reduce image contrast and brightness in response to a voltage representative of beam current in excess of a desired value.

In accordance with the present invention, a system for processing an image representative video signal having a peak amplitude determinative of image contrast and a D.C. level determinative of image brightness includes a video signal transmission channel, and an image reproducing device for reproducing an image in response to video signals coupled via the transmission channel. Current drawn by the image reproducing device is responsive to the peak amplitude and D.C. level of the video signal. Means are also included for deriving a control voltage representative of the magnitude of the current drawn by the image reproducing device when the current exceeds a predetermined level. The control voltage is coupled to the signal transmission channel when the current exceeds the predetermined level by an amount within a first range of current, for varying the peak amplitude of the video signal to inhibit current above the predetermined level. When current exceeds the predetermined level by a relatively greater amount within a second range, the control voltage serves to vary both the peak amplitude and the D.C. level of the video signal to inhibit current above the predetermined level.

The single FIGURE of the drawing shows, partially in block diagram form and partially in schematic circuit diagram form, a general arrangement of a color television receiver employing a circuit constructed in accordance with the present invention.

Referring now to the drawing, a general arrangement of a color television receiver employing the present invention includes a video signal processing unit 20 responsive to radio frequency television signals for generating, by means of suitable intermediate frequency circuits and detection circuits (not shown), a composite video signal comprising chrominance, luminance, sound and synchronizing signals. An output of video signal processing unit 20 is coupled to a chrominance channel 30, to a luminance channel 40, and to a sync separator 50.

Chrominance channel 30 includes a frequency selection unit 31 for selectively coupling the chrominance portion of the video signal to a chrominance processing unit 34. Chrominance processing unit 34 serves to derive R-Y, B-Y and G-Y color difference signals from the chrominance portion of the composite video signal.

A luminance signal processing unit 45 of luminance channel 40 serves to amplify and otherwise process the luminance portion of the composite video signal coupled to input terminal 1 of unit 45. Luminance processor 45 includes a video signal amplifying stage 46, and a keyed clamp or D.C. restoring circuit 47 operatively associated with a coupling capacitor 49 for clamping the blanking level of the video signal to a fixed reference level during blanking intervals of the video signal. Amplifier 46 and keyed clamp circuit 47, 49 may be similar to the amplifier and clamping arrangement described in U.S. Pat. No. 3,927,255 (Yorkanis). Luminance processor 45 may also include circuits (not shown) prior to amplifier 46 for attenuating undesirable signals present in luminance channel 40 such as chrominance or sound signals, while accentuating or peaking the amplitudes of relatively high frequency components of the luminance signals to improve the transient response and fine detail resolution of reproduced images.

Contrast control of a reproduced image is provided in response to a D.C. voltage applied to a contrast control input terminal 3 of luminance processor 45. The voltage coupled to terminal 3 can provide contrast control by altering the gain of the video amplifying stage 46 and therefore the amplitude of the luminance signals. Brightness control of a reproduced image is provided in response to a D.C. voltage coupled to a brightness control input terminal 4 of luminance processor 45. The voltage coupled to terminal 4 serves to control the D.C. content of the luminance signal, and thereby the brightness of a reproduced image. In this example, the D.C. voltage from terminal 4 is combined with the clamped luminance signal produced by blanking level clamping circuit 47, to thereby provide a new D.C. level of the luminance signal. The contrast and brightness functions will be described in greater detail subsequently.

The output of luminance processor 45 is coupled via a terminal 2 to a PNP luminance driver amplifier transistor 48 for providing an amplified luminance output signal Y. The amplified luminance output signal Y and the R-Y, B-Y and G-Y color difference output signals of chrominance channel 30 are coupled to a kinescope driver 38 where they are matrixed to form R, B and G color signals. The R, B, G color signals drive a kinescope (not shown). Alternatively, the luminance and color difference signals may be matrixed in the kinescope or prior to the kinescope driver stage, as is known.

Sync separator 50 derives periodic vertical and horizontal line sync signals from the video signal, which are coupled to a deflection unit 60. Deflection unit 60 comprises horizontal and vertical circuit portions for generating periodic horizontal deflection and blanking signals and periodic vertical deflection and blanking signals, respectively. The horizontal and vertical deflection signals are respectively coupled to horizontal and vertical deflection winding associated with the kinescope. The horizontal and vertical blanking signals are coupled to the luminance channel for blanking the luminance channel during horizontal and vertical retrace intervals, and for keying blanking level clamping circuit 47.

The horizontal circuit portion of deflection unit 60 also supplies periodic horizontal flyback pulses during the horizontal sync or retrace interval to an input of a D.C. voltage multiplier (e.g., voltage tripler) 70 which supplies high operating voltages for ultor and focus electrodes of the kinescope. A source of substantially constant current 71 comprises a source of potential B+ (e.g., +27 volts) and a current determining resistor 72, and is coupled to an input of multiplier 70 via a resistor 74. Current flowing through resistor 74 is representative of the beam current demand of the kinescope.

An automatic beam current limiter circuit 100 comprises a control circuit 110 for generating a control signal representative of and directly proportional to the magnitude of kinescope beam current when above a predetermined level, and a threshold conduction network including normally non-conducting switching diodes 125, 127 and a resistive voltage determining network including resistors 119, 122 and 124. The threshold conduction network is coupled to a contrast control stage 130 and a brightness control stage 150.

Control circuit 110 includes a normally saturated, grounded emitter NPN control transistor 120. A base electrode of transistor 120 is coupled via a current limiting resistor 112 to a junction of resistors 72 and 74, and a base-emitter junction of transistor 120 is shunted by a diode 118 for preventing reverse conduction breakdown of transistor 120. The gain of transistor 120 is stabilized by a collector-base negative feedback network comprising resistor 114 and capacitor 115. A resistor 117 provides direct current degenerative feedback for transistor 120 during the beam limiting mode of operation.

A collector output of transistor 120 is coupled to resistor 122 and to a +22 volt bias supply (+) via resistors 124 and 119. A beam current limiting control signal developed at the collector of transistor 120 is coupled to an anode of diode 125 via resistor 124, and to an anode of diode 127.

The operation of control circuit 110 including transistor 120 will be discussed, and is described in detail in a copending U.S. patent application Ser. No. 794,126 entitled "Beam Current Limiter With Independence Of Threshold Level And Dynamic Control Range", of J. J. Serafini, filed concurrently with this application and assigned to the same assignee as the present invention.

Contrast control stage 130 includes a potentiometer 135 manually adjustable by a viewer for setting the contrast of an image, during normal operating conditions, between minimum (MIN) and maximum (MAX) extremes as determined by the position of the wiper arm of potentiometer 135. A normally desired minimum contrast range of potentiometer 135 is set by a resistor 134. Resistor 134 is coupled between potentiometer 135 and a source of potential $+V_1$ for potentiometer 135. Additional, automatic contrast control can be provided by a light dependent resistor (not shown) or similar device responsive to ambient light conditions and coupled between the lower end of the resistance element of contrast potentiometer 135 and ground, for example.

The wiper of potentiometer 135 is coupled to a filter capacitor 141 and to a base electrode of a PNP contrast control buffer transistor 140 through resistor 138 and a resistor 139. A cathode electrode of diode 127 is coupled to the junction of resistors 138 and 139. The maximum contrast range is tailored by a resistor 146, and by a pre-set potentiometer 145 included in the emitter circuit of transistor 140. A contrast control voltage appearing at a wiper of potentiometer 145 is filtered by a capacitor 148 and coupled to contrast control input terminal 3 of luminance processor 45.

Voltages appearing at an emitter of transistor 40 are coupled via a resistor 149 and a terminal A to a viewer adjustable color control stage 170. Color control stage 170 comprises a potentiometer 172 coupled to a voltage source $+V_3$ and to terminal A. A voltage appearing at a wiper of potentiometer 172 serves to vary the gain of chrominance processing unit 34 and thereby the amplitude of color difference signals processed by unit 34.

Brightness control stage 150 includes a potentiometer 152 manually adjustable by a viewer for setting the brightness of an image, during normal operating conditions, between minimum (MIN) and maximum (MAX) extremes as determined by the position of the wiper arm of potentiometer 152. A desired effective resistance of potentiometer 152 is provided by the parallel combination of the resistive element of potentiometer 152 and a resistor 155, and normally desired minimum and maximum brightness range settings are established by range limiting resistors 154 and 157, respectively. Resistor 154 is coupled between potentiometer 152 and a source of potential +V₂ for potentiometer 152. A brightness control voltage appearing at the junction of resistors 158 and 160 is coupled to brightness control input terminal 4 of luminance processor 45 via resistor 160. The voltage coupled to terminal 4 is filtered by a capacitor 163.

In the design of brightness control circuits, it is often desirable to provide a relatively restricted range of brightness control in order to simplify adjustment of image brightness by a viewer, while maintaining a range of brightness control which encompasses normally expected viewer preferences for image brightness. Such a restricted brightness control range also serves to avoid severe misadjustment of image brightness by the viewer, thereby assisting to maintain beam current within desired limits.

Accordingly, it is assumed in this example, that the range of brightness control voltage normally developed at the wiper of brightness potentiometer 152 is restricted and of a greater average magnitude compared to the range and average magnitude of contrast control voltage normally developed at the wiper of contrast potentiometer 135. As a more specific example, it is assumed that +10 volts and +9 volts are developed at the wiper of brightness potentiometer 152 in the minimum and maximum brightness positions, respectively, and +10 volts and zero volts (ground potential) appear at the wiper of contrast potentiometer 135 in the minimum and maximum contrast positions, respectively.

During normal operation of the receiver, the beam current demand of the kinescope is less than a predetermined level of maximum desired current. Current supplied from current source 71 divides such that the current supplied to the input of multiplier 70 via resistor 74 is representative of beam current demand of the kinescope, and the current supplied to the base input of control transistor 120 via resistor 112 is sufficient to render transistor 120 highly conductive or saturated. The collector of saturated transistor 120 and therefore the anodes of diodes 125, 127 are near ground potential. Voltages normally appearing at the cathode of diode 127 via the wiper of contrast potentiometer 135, and voltages normally appearing at the cathode of diode 125 via the wiper of brightness potentiometer 152, are insufficient to forward bias diodes 125 and 127 into conduction during normal operating conditions. Contrast control stage 130 and brightness control stage 150 therefore operate in normal fashion by adjustment of contrast potentiometer 135 and brightness potentiometer 152 during this time.

When average kinescope beam current exceeds the predetermined level by an amount within a first range corresponding to moderately excessive beam current, the current supplied to voltage multiplier 70 via resistor 74 increases accordingly, and the base current supplied to transistor 120 via transistor 112 decreases due to the increased current demand of voltage multiplier 70. The decrease in base current of transistor 120 is in a direction to render transistor 120 less conductive. Transistor 120 then comes out of saturation and conducts in a linear operating range, whereby the collector potential of transistor 120 increases. The operating control range of transistor 120 is a function of the value of feedback resistor 117, as described in the copending, concurrently filed U.S. patent application of J. J. Serafini mentioned previously.

The collector potential of transistor 120 represents a control voltage for controlling the conduction of diodes 125 and 127. In this connection, it is noted that the values of collector resistors 119 and 124 are selected so that, in the presence of moderately high average beam current above the predetermined level, the voltage appearing at the junction of resistors 119 and 124 in response to the collector control voltage of transistor 120 is insufficient to forward bias diode 125 into conduction for various settings of brightness potentiometer 152. Thus, the normal operation of brightness control stage 150 is unaffected in the presence of moderately high average beam current. However, this control voltage is sufficient at this time to forward bias diode 127 into conduction for predetermined settings of contrast potentiometer 135.

The control signal developed at the collector of transistor 120 is representative of average rather than instantaneous or peak beam current demand. This is accomplished by virtue of the A.C. feedback network including capacitor 115. Since capacitor 115 presents a low impedance to an alternating or instantaneous signal component which may appear at the collector of transistor 120 during the beam limiting mode, such alternating component is coupled to the base electrode of transistor 120 via capacitor 115. An amplified version of this first occurring, A.C. coupled alternating component then appears at the collector of transistor 120 and cancels with the first occurring alternating component.

When diode 127 conducts, a voltage coupled to the base of contrast buffer transistor 140 from the collector of transistor 120 is in a direction to raise the base voltage and therefore reduce the conduction of transistor 140. In this example, the reduced conduction of transistor 140 serves to reduce the gain of video amplifier 46 and therefore the peak amplitude of the video signal toward the black level of the video signal. Image contrast is thereby reduced, and beam current is prevented from exceeding the predetermined level.

When the peak amplitude of the video signal is reduced, the D.C. level of the video signal appearing at the output of video amplifier 46 is reduced a proportional amount toward the black level. The black level of the video signal remains substantially unchanged, however. Since the black reference level remains unchanged, and since the D.C. level changes in proportion to and in the same direction as the change of the peak amplitude of the video signal, the effect of limiting moderately high beam current is less noticeable by the viewer compared to limiting beam current by reducing image brightness with an attendant change in the black reference level.

Thus, moderately high beam current above the predetermined level is inhibited by reducing peak beam current in accordance with the amount of reduction of peak signal amplitude, and by limiting average beam current in accordance with the amount by which the D.C. level of the video signal is reduced as peak amplitude is reduced.

It is noted that the resistance appearing between the wiper of contrast potentiometer 135 and ground diminishes as the position of the wiper approaches the maximum (MAX) contrast setting. If the wiper is set to the maximum contrast position, for example, the wiper and therefore the base of contrast buffer transistor 140 will be at substantially ground potential. The control voltage coupled from the collector of transistor 120 via diode 127 would therefore be ineffective to limit the conduction of transistor 140. Resistor 138 overcomes the difficulty presented by this situation by causing a voltage to be developed thereacross which is related to the control voltage. Resistor 138 therefore provides a means of "pulling up" the base voltage of transistor 140 in accordance with the magnitude of the control voltage, so that the conduction of transistor 140 can be controlled when beam limiting is required in this situation.

When average kinescope beam current exceeds the predetermined level by an amount within a second range greater than the first range, the current supplied to high voltage multiplier 70 proportionally increases and the base current of transistor 120 proportionally decreases. Transistor 120 therefore conducts proportionally less and the collector control voltage of transistor 120 increases further.

In this condition of very high beam current, diode 127 remains conductive and the voltage coupled to the base of contrast control transistor 140 via diode 127 continues to increase. The conduction of transistor 140 continues to decrease further whereby peak signal amplitude and image contrast are further reduced in the manner mentioned above. At the same time, diode 125 is forward biased into conduction in response to the increased control voltage now appearing at the collector of transistor 120 and consequently at the junction of resistors 119 and 124. This control voltage is coupled to terminal 4 of unit 45 and is of a magnitude and direction to change the average D.C. level of the clamped, peak controlled video signal appearing at the output of clamp 47 such that image brightness is reduced and beam current above the predetermined level is inhibited. The black reference level of the video signal is shifted in a "blacker-than-black" direction in this instance due to the shifted average D.C. level of the clamped video signal. In this connection it is noted that resistor 124 serves to limit the maximum value of the control voltage which is applied to terminal 4 of unit 45.

It is noted that a greater amount of beam current control is required in inhibit or limit very high average beam currents within the second range. Reducing very high beam currents by reducing both contrast and brightness is considered to be advantageous, since by this manner of operation the relationship between image contrast and image brightness is not excessively disturbed as beam current limiting is accomplished. The effect of beam current limiting in this instance is less noticeable and therefore less objectionable to the viewer compared to reducing only contrast or brightness. If only brightness were reduced under these circumstances, a reproduced image would appear to have excessive contrast. More specifically, dark image detail will be deteriorated. A reduction in contrast alone would produce a faded or "washed out" image.

Referring now to contrast control stage 130 together with color control stage 170, it is noted that a voltage appearing at the emitter of contrast buffer transistor 140 in response to the position of contrast control potentiometer 135 also appears at terminal A. This voltage also appears at the lower end of potentiometer 172 of color control stage 170 and, in conjunction with voltage source $+V_3$, determines the voltage developed across potentiometer 172.

Under normal conditions, if the wiper of contrast potentiometer 135 is set to a given position so that the emitter voltage of transistor 140 is accordingly fixed, color control can be provided by adjusting color control potentiometer 172 between the minimum (MIN) and maximum (MAX) positions to increase or decrease the gain of chrominance processing unit 34 and thereby the peak-to-peak amplitude of the color difference signals. Thus increasing voltages appearing at the wiper of color potentiometer serve to decrease the gain of chrominance unit 34, and decreasing voltages serve to increase the gain of chrominance unit 34.

When the position of the wiper of contrast potentiometer 135 is changed, a corresponding change in the emitter voltage of transistor 140 results. A corresponding proportional change in the voltage appearing at the wiper of color potentiometer 172 also results, so that the color control voltage applied to chrominance unit 34 tracks with the contrast control voltage applied to luminance processor 45. Thus an increase or decrease of the peak-to-peak amplitude of the color difference signals processed by chrominance unit 34 is associated with a corresponding increase or decrease of the peak-to-peak amplitude of the video signal processed by luminance processor 45, as contrast control potentiometer 135 is adjusted.

A similar result is produced during the beam limiting mode of operation. As explained earlier, during this time a contrast control voltage is applied to terminal 3 of luminance processor 45 via the collector of transistor 120, diode 127 and the emitter circuit of transistor 140. Thus the emitter voltage of transistor 140 is related to the beam limiting control voltage at this time.

When the beam limiting control voltage provided at the collector of transistor 120 increases, the emitter voltage of transistor 140 increases accordingly, thereby reducing the peak-to-peak amplitude of the luminance signal processed by luminance processor 45. Also, the voltage appearing at terminal A and therefore the wiper voltage of color control potentiometer 152 proportionally increase in a direction to reduce the peak-to-peak amplitude of color difference signals processed by unit 34. Consequently, the amplitude of the color difference signals (and therefore the amplitudes of the R, B, G color signals) track with changes in the amplitude of the luminance signal during the beam limiting mode. By this manner of operation, the effect of beam current limiting is less noticeable and therefore less objectionable to the viewer, since the respective amplitudes of the luminance and chrominance signal components are maintained in desired relationship.

Resistor 158 serves a purpose similar to that of resistor 138, by "pulling up" the voltage appearing at the junction of resistor 160 and the cathode of diode 125 when brightness potentiometer is set to a relatively low resistance position. Resistor 158 is not required if range limiting resistors 154 and 157 are sufficiently large.

Resistor 138 also serves as a voltage dropping resistor with respect to a voltage appearing at the wiper of potentiometer 135 when potentiometer 135 is set to the minimum (MIN) position, in particular. For this setting of potentiometer 135, resistor 138 insures that the cathode potential of diode 127 is insufficient to keep diode 127 reverse biased (i.e., non-conductive) when diode 127 is required to conduct in response to the control voltage coupled to the anode electrode of diode 125. Resistor 158 serves a similar purpose in conjunction with potentiometer 152 and diode 125.

The value of collector resistors 119 and 124 are selected to provide a desired range of control voltage for forward biasing diode 127 in the presence of moderately high beam currents, and for forward biasing both diodes 125 and 127 in the presence of very high beam currents. Gain provided by transistor 120 assures that the control voltage will track with increases of average beam current above the predetermined level to provide accurate limiting of excessive average beam current levels.

Although the present invention has been described with reference to a particular embodiment, various additional modifications can be made within the scope of the invention.

For example, control circuit 110 of beam limiter 100 can be arranged to respond to peak rather than to average beam current. However, in operation beam limiter 100 essentially serves to reduce peak beam currents, since peak signal amplitude is reduced during beam limiting, as discussed. This result produces an advantage when the deflection system of the kinescope is sensitive to peak beam currents.

In addition, the range and magnitude of the contrast and brightness control voltages normally developed at respective wipers of the contrast and brightness control potentiometers can be similar. In this case, however, a voltage level shifting network operatively associated with diodes 125, 127 or functionally equivalent devices may be required to insure that the beam limiting control voltage is sequentially applied to control the contrast and brightness functions in the manner discussed.

Moreover, the manual and automatic contrast and brightness control functions need not be interrelated structurally as specifically shown in the drawing. Thus, the manual and automatic contrast control voltages may be applied to separate points in the video signal processing stage to independently control the amplitude of the video signal, in accordance with the requirements of a particular video signal processing system. A similar conclusion applies with respect to the manual and automatic brightness control functions.

It is also noted that the arrangement described in detail herein senses the presence of excessive beam current directly, rather than directly sensing the content of the signals producing excessive beam current levels. This is because, due to the non-linear characteristics of a typical kinescope, television signals having large A.C. components will produce higher average beam currents than television signals of the same average value but having little or no A.C. components. The arrangement described above is therefore more accurate in detecting and controlling the parameter of primary interest, namely the value of beam current intensity. It should be recognized, however, that the principles of the present invention are equally applicable to a system which senses the content (i.e., peak amplitude or D.C. level) of the signals producing excessive beam current levels.

Beam limiter 100 need not be employed in conjunction with a luminance processing unit including a keyed clamp or D.C. restoration circuit. Such circuits typically are employed to minimize the adverse effects of D.C. drift due to variations in the values of circuit components, for example. Thus a D.C. clamp or restoration circuit may not be needed when such D.C. drift does not exist or where some D.C. drift can be tolerated.

The principles of the present invention furthermore are applicable to both monochrome and color image reproducing systems, and to such systems which do not include provision for manual adjustment of image contrast and brightness by the viewer.

What is claimed is:

1. In a system for processing an image representative video signal having a peak amplitude determinative of image contrast and a D.C. level determinative of image brightness, said system including a video signal transmission channel, and an image reproducing device for reproducing an image in response to video signals transmitted via said channel, current drawn by said image reproducing device being responsive to said peak amplitude and said D.C. level of said video signal, apparatus comprising:

means for deriving a control voltage representative of the magnitude of current drawn by said image reproducing device when said current exceeds a predetermined level; and means for coupling said control voltage to said signal transmission channel when said current exceeds said predetermined level by an amount within a first range of current for varying said peak amplitude to inhibit said current above said predetermined level, and for varying both said peak amplitude and said D.C. level to inhibit said current above said predetermined level when said current exceeds said predetermined level by a relatively greater amount within a second range of current.

2. Apparatus according to claim 1, wherein said coupling means comprises:

normally non-conductive threshold conduction means having an input coupled to said means for deriving said control voltage and an output coupled to said signal transmission channel, said threshold conduction means being rendered conductive in response to said control voltage representative of said current in excess of said predetermined level.

3. Apparatus according to claim 2, wherein said threshold conduction means comprises:

first and second normally non-conductive controllable conduction devices having respective inputs coupled to said control voltage and respective outputs coupled to said signal transmission channel;

said first device being rendered conductive in response to said control voltage representative of said current within said first range, for coupling said control voltage to said signal transmission channel to vary said peak amplitude to inhibit said current above said predetermined level; and said first device remaining conductive and said second device being rendered conductive in response to said control voltage representative of said current within said second range, for coupling said control voltage to said signal transmission channel to vary said D.C. level to inhibit said current above said predetermined level.

4. Apparatus according to claim 3 and further comprising:

contrast control means coupled to said output of said first device and to said signal transmission channel, for controlling said peak amplitude of said video signal during normal operating conditions when said current is substantially equal to or less than said predetermined level; and brightness control means coupled to said output of said second device and to said signal transmission channel for controlling said D.C. voltage of said video signal during said normal operating conditions.

5. Apparatus according to claim 3 and further comprising:

high voltage supplying means for providing operating potential for said image reproducing device;

a source of current coupled to an input of said high voltage supplying means for providing a current representative of the magnitude of current drawn by said image reproducing device; and said means for deriving said control voltage being coupled to said current source for sensing the magnitude of said representative current to provide said control voltage proportional to the magnitude of said representative current.

6. Apparatus according to claim 5, wherein:

said means for deriving said control voltage comprises an active current conduction device having an input electrode coupled to said current source, a common electrode, and an output electrode for providing said control voltage.

7. Apparatus according to claim 6, wherein:

said active current conduction device is responsive to average current demand of said image reproducing device.

8. Apparatus according to claim 6, wherein:

said active current conduction device is a transistor having an input base electrode, a common emitter electrode and an output collector electrode; and said first and second devices comprise normally non-conductive PN junction devices.

9. In a video signal processing system including a luminance channel for processing a luminance component of said video signal, an image reproducing device and high voltage supply means for providing operating potential for said image reproducing device, apparatus comprising:

means for deriving a control voltage representative of the magnitude of current drawn by said image reproducing device from said high voltage supply means when said current exceeds a predetermined level;

first means for coupling said control voltage to said luminance channel when said current exceeds said predetermined level by an amount within a first range of current, for varying the peak amplitude of said luminance component to inhibit said current above said predetermined level; and second means for coupling said control voltage to said luminance channel when said current exceeds said predetermined level by a relatively greater amount within a second range of current, for varying both the peak amplitude and the D.C. level of said luminance component to inhibit said current above said predetermined level.

10. In a system for processing an image representative television signal, said system including a luminance channel for processing a luminance component of said television signal having a peak amplitude determinative of image contrast and an average D.C. level determinative of image brightness, contrast control means coupled to said luminance channel for varying said peak amplitude of said luminance component, brightness control means coupled to said luminance channel for varying said average D.C. level of said luminance component, and a kinescope for reproducing an image in response to television signals coupled via said luminance channel, a kinescope beam current limiter comprising:

means for deriving a control voltage representative of the magnitude of average current drawn by said kinescope when said current exceeds a predetermined level;

first means for coupling said control voltage to said contrast control means when said current exceeds said predetermined level by an amount within a first range of current, for varying said peak amplitude and thereby said image contrast to inhibit said current above said predetermined level; and second means for coupling said control voltage to said brightness control means when said current exceeds said predetermined level by a relatively greater amount within a second range of current, for varying said peak amplitude and thereby said image contrast, and for varying said D.C. level and thereby said image brightness to inhibit said current above said predetermined level.

11. A beam current limiter according to claim 10, wherein:

said contrast control means comprises means for manually adjusting said peak amplitude when said current is substantially equal to or less than said predetermined level during normal operation of said system; and said brightness control means comprises means for manually adjusting said D.C. level during said normal operation.

12. A beam current limiter according to claim 11, wherein said luminance channel includes:

controllable gain amplifier means responsive to adjustment of said manually adjustable contrast control means during said normal operating condition and to said control voltage when said current exceeds said predetermined level, for controllably varying said peak amplitude of said luminance component; and means for clamping said controlled amplitude signal provided by said amplifier means to a reference level corresponding to a blanking level of said luminance component, a D.C. level of said clamped signal being varied in response to adjustment of said manually adjustable brightness control means during said normal operating condition and to said control voltage when said current exceeds said predetermined level.

13. A beam current limiter according to claim 12 and further comprising:

high voltage supplying means for providing operating potential for said kinescope; and wherein said means for deriving said control voltage senses the magnitude of average current drawn by said kinescope from said high voltage supplying means.

14. In a system for processing a color image representative television signal, said system including a chrominance channel for processing a chrominance component of said television signal, color control means coupled to said chrominance channel for varying the gain of said chrominance channel and thereby the amplitude of said chrominance component; a luminance channel for processing a luminance component of said television signal having a peak amplitude determinative of image contrast and an average D.C. level determinative of image brightness, contrast control means coupled to said luminance channel for varying said peak amplitude of said luminance component, brightness control means coupled to said luminance channel for varying said average D.C. level of said luminance component; and a kinescope for reproducing a color image in response to television signals coupled via said chrominance and luminance channels, a kinescope beam current limiter comprising:

means for deriving a control voltage representative of the magnitude of average current drawn by said kinescope when said current exceeds a predetermined level;

first means for coupling said control voltage to said contrast control means and to said color control means when said current exceeds said predetermined level by an amount within a first range of current, for varying said amplitude of said chrominance component and said peak amplitude of said luminance component to inhibit said current above said predetermined level; and second means for coupling said control voltage to said brightness control means when said current exceeds said predetermined level by a relatively greater amount within a second range of current, for varying said D.C. level and thereby said image brightness to inhibit said current above said predetermined level.

15. A beam current limiter according to claim 14, wherein:

said brightness control means comprises means for manually adjusting said D.C. level when said current is substantially equal to or less than said predetermined level during normal operation of said system;

said color control means comprises means for manually adjusting said amplitude of said chrominance component during said normal operation; and said contrast control means comprises means for manually adjusting said peak amplitude during said normal operation.

16. A beam current limiter according to claim 15, wherein:

said contrast control means is also coupled to said color control means so that said amplitude of said chrominance component is varied in response to adjustment of said contrast control means.

17. A beam current limiter according to claim 16, wherein said contrast control means further comprises:

controllable gain amplifier means responsive to adjustment of said manually adjustable contrast control means during said normal operating condition and to said control voltage when said current exceeds said predetermined level, for controllably varying said peak amplitude of said luminance component and said amplitude of said chrominance component.

18. A video signal control circuit for limiting beam current drawn by a kinescope in response to a video signal, comprising:

a source of video signal;

a controllable gain amplifier having an input coupled to said source and an output for providing an amplified video signal;

means for coupling said amplifier video signal to said kinescope;

a source of current representative of the magnitude of beam current drawn by said kinescope in response to said amplified video signal;

a variable conduction semiconductor device coupled to said current source for sensing the magnitude of said representative current and for providing a variable output control voltage proportional to the amount by which a predetermined level of beam current is exceeded;

a first normally non-conductive semiconductor device coupled to said output of said variable conduction device and to said video amplifier;

a second normally non-conductive semiconductor device coupled to said output of said variable conduction device and to said coupling means;

said first device being rendered conductive in response to said control voltage when representative of a first range of beam current above said predetermined level, for coupling said control voltage to said video amplifier to control the gain thereof and thereby vary the amplitude of said video signal to inhibit beam current above said predetermined level; and said first device remaining conductive for varying said amplitude of said video signal and said second device being rendered conductive in response to said control voltage when representative of a second, relatively greater range of beam current above said predetermined level, for coupling said control voltage to said coupling means to vary the D.C. level of said amplitude controlled amplified video signal, whereby said amplitude and D.C. level of said video signal are varied to inhibit said beam current above said predetermined level.

19. In a system for processing a color image representative video signal containing chrominance and luminance components, said system including a chrominance channel for processing said chrominance component; a luminance channel for processing said luminance component; and a kinescope for reproducing a color image in response to video signals coupled via said chrominance and luminance channels, a kinescope beam current limiter comprising:

means for deriving a control voltage representative of the magnitude of current drawn by said kinescope when said current exceeds a predetermined level; and means for coupling said control voltage to said luminance and chrominance channels when said current exceeds said predetermined level by an amount within a first range of current, for varying the peak amplitudes of said luminance and chrominance components to inhibit said current above said predetermined level; and for varying both said peak amplitudes of said luminance and chrominance components and the D.C. level of said luminance component to inhibit said current above said predetermined level when said current exceeds said predetermined level by a relatively greater amount within a second range of current.

* * * * *